(12) United States Patent
Qafisheh et al.

(10) Patent No.: US 9,243,195 B2
(45) Date of Patent: Jan. 26, 2016

(54) PROCESS AND APPARATUS FOR FLUID CATALYTIC CRACKING AND HYDROCRACKING HYDROCARBONS

(71) Applicant: UOP LLC, Des Plaines, IL (US)

(72) Inventors: Jibreel A. Qafisheh, Prospect Heights, IL (US); Boyd E. Cabanaw, Owasso, OK (US); Xin X. Zhu, Long Grove, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 14/249,007

(22) Filed: Apr. 9, 2014

(65) Prior Publication Data

US 2015/0290555 A1 Oct. 15, 2015

(51) Int. Cl.
*C10G 69/04* (2006.01)
*C10G 49/22* (2006.01)
*B01J 8/18* (2006.01)
*B01J 8/04* (2006.01)
*B01D 3/00* (2006.01)

(52) U.S. Cl.
CPC .............. *C10G 69/04* (2013.01); *B01D 3/009* (2013.01); *B01J 8/0453* (2013.01); *B01J 8/1845* (2013.01); *C10G 49/22* (2013.01)

(58) Field of Classification Search
CPC .................................................... C10G 70/041
See application file for complete search history.

(56) References Cited

U.S. PATENT DOCUMENTS

| | | | |
|---|---|---|---|
| 3,748,251 A | 7/1973 | Demmel et al. | |
| 3,891,538 A | 6/1975 | Walkey | |
| 4,426,276 A * | 1/1984 | Dean et al. ............... | 208/60 |
| 4,436,613 A | 3/1984 | Sayles et al. | |
| 4,604,185 A | 8/1986 | McConaghy, Jr. et al. | |
| 5,059,301 A | 10/1991 | Roussel et al. | |
| 5,076,910 A * | 12/1991 | Rush ............................ | 208/348 |
| 5,080,777 A | 1/1992 | Aegerter, Jr. et al. | |
| 5,360,533 A | 11/1994 | Tagamolila et al. | |
| 5,685,972 A | 11/1997 | Timken et al. | |
| 7,220,351 B1 | 5/2007 | Pontier et al. | |
| 7,265,252 B1 | 9/2007 | Frey et al. | |
| 7,470,357 B1 | 12/2008 | Hoehn et al. | |
| 7,611,622 B2 | 11/2009 | Niccum et al. | |
| 7,682,500 B2 | 3/2010 | Kalnes | |
| 7,837,860 B1 | 11/2010 | Hoehn et al. | |
| 8,529,753 B2 | 9/2013 | Niu et al. | |
| 8,864,979 B2 | 10/2014 | Palmas | |
| 8,894,840 B2 | 11/2014 | Leonard et al. | |
| 2001/0031227 A1 | 10/2001 | Lomas | |
| 2009/0127161 A1 | 5/2009 | Haizmann et al. | |

(Continued)

FOREIGN PATENT DOCUMENTS

EP 1050572 A2 11/2000

OTHER PUBLICATIONS

U.S. Appl. No. 14/248,904, filed Apr. 9, 2014.

(Continued)

*Primary Examiner* — Lessanework Seifu
(74) *Attorney, Agent, or Firm* — James C. Paschall (57) ABSTRACT

A process and apparatus for recovering cycle oil from FCC CSO is described. By feeding the additional cycle oil to a hydrocracking unit additional diesel, naphtha and petrochemical feedstock may be obtained. The additional cycle oil is obtained by vacuum separation of the CSO. The described process and apparatus can provide additional recovery for a refiner.

19 Claims, 2 Drawing Sheets

(56) References Cited

U.S. PATENT DOCUMENTS

| | | |
|---|---|---|
| 2009/0129998 A1* | 5/2009 | Haizmann et al. ............ 422/190 |
| 2009/0288985 A1 | 11/2009 | Long et al. |
| 2011/0005972 A1 | 1/2011 | Kim et al. |
| 2011/0207979 A1 | 8/2011 | Kim et al. |
| 2013/0001130 A1 | 1/2013 | Mo |
| 2013/0048537 A1 | 2/2013 | Noh et al. |
| 2013/0062250 A1 | 3/2013 | Gao et al. |
| 2013/0343956 A1 | 12/2013 | Al-Thubaiti et al. |

OTHER PUBLICATIONS

U.S. Appl. No. 14/248,923, filed Apr. 9, 2014.
U.S. Appl. No. 14/248,945, filed Apr. 9, 2014.
U.S. Appl. No. 14/248,985, filed Apr. 9, 2014.
Mandal, "Effect of Coke on Catalysts in Distillate FCC Unit Performance", Ind. Eng. Chem. Res., 1993, 32, 1018-1023.
U.S. Appl. No. 14/642,962, filed Mar. 10, 2015.
U.S. Appl. No. 14/642,972, filed Mar. 10, 2015.
U.S. Appl. No. 14/642,977, filed Mar. 10, 2015.
U.S. Appl. No. 14/642,985, filed Mar. 10, 2015.
U.S. Appl. No. 14/642,986, filed Mar. 10, 2015.
U.S. Appl. No. 14/642,990, filed Mar. 10, 2015.
Search Report dated Jun. 16, 2015 for corresponding PCT Appl. No. PCT/US2015/022914.
Search Report dated Jun. 29, 2015 for corresponding PCT Appl. No. PCT/US2015/024860.

* cited by examiner

PROCESS AND APPARATUS FOR FLUID CATALYTIC CRACKING AND HYDROCRACKING HYDROCARBONS

BACKGROUND

The field of the invention is fluid catalytic cracking (FCC) and hydrocracking.

FCC technology, now more than 50 years old, has undergone continuous improvement and remains the predominant source of gasoline production in many refineries. This gasoline, as well as lighter products, is formed as the result of cracking heavier, less valuable hydrocarbon feed stocks such as gas oil.

In its most general form, the FCC process comprises a reactor that is closely coupled with a regenerator, followed by downstream hydrocarbon product separation. Hydrocarbon feed contacts catalyst in the reactor to crack the hydrocarbons down to smaller molecular weight products. During this process, coke tends to accumulate on the catalyst which is burned off in the regenerator.

The least valuable product from an FCC process is clarified slurry oil (CSO) which is withdrawn from the bottom of the FCC main fractionation column and burned as fuel. The CSO comprises the heaviest product mixed with catalyst particles that have not been successfully removed from the FCC products. Light Cycle Oil (LCO) is also produced in an FCC unit and can be directed to the diesel pool. However, LCO may degrade the quality of the diesel pool due to its high aromaticity and low cetane value. The CSO is less valuable than Light Cycle Oil. Due to operational constraints of FCC main fractionation column, the CSO leaves the main fractionator with an appreciable amount of hydrocarbons in the boiling range of LCO and a small amount in the boiling range of gasoline. Heavy cycle oil (HCO) is an FCC product pumped around to cool the main fractionation column but is not often recovered from the main fractionation column.

For FCC units experiencing coking in the main fractionation column bottoms, the main column can be operated at a lower temperature by reducing the flow rate of LCO withdrawn from an LCO side outlet of the main fractionation column and increasing the flow rate of CSO withdrawn from the main fractionation column bottom. The additional LCO in CSO will lower FCC main fractionation column temperature, reduce coking and maintenance on FCC main column bottoms exchangers. However, the refiner who operates with extra LCO in CSO bottoms stream to prevent maintenance issues pays a penalty by losing the additional LCO in the CSO which is not recovered.

Hydrocracking is a hydroprocessing process in which hydrocarbons crack at the carbon-carbon bonds in the presence of hydrogen and hydrocracking catalyst to lower molecular weight hydrocarbons. Depending on the desired output, a hydrocracking unit may contain one or more fixed beds of the same or different catalyst. Hydrotreating is a hydroprocessing process in which heteroatoms are removed from hydrocarbons and olefinic compounds are saturated.

It would be desirable to recover useful hydrocarbons from CSO. It may also be desirable to upgrade the hydrocarbons recovered from CSO to make quality diesel.

SUMMARY OF THE INVENTION

In a process embodiment, the invention is a process for catalytically cracking hydrocarbons comprising feeding a hydrocarbon feed stream to an FCC reactor and contacting the hydrocarbon feed stream with catalyst to catalytically crack the hydrocarbon feed stream to provide a cracked stream The cracked stream is disengaged from the catalyst. The cracked stream is fractionated into products including a slurry oil stream from a bottom of a main fractionation column which is separated into a cycle oil process stream and a heavy stream under vacuum pressure in a separator. The cycle oil process stream is refluxed to the main fractionation column.

In an apparatus embodiment, the invention is an apparatus for producing upgraded product comprising an FCC reactor and a main fractionation column in communication with the FCC reactor. A vacuum separator is in communication with a main bottoms line of the main fractionation column and a hydrocracking unit is in communication with a side outlet of the main fractionation column.

Advantageously, the process can enable recovery of LCO and/or HCO from CSO to be used as motor fuel or further upgraded to make quality diesel and petrochemicals.

Additional features and advantages of the invention will be apparent from the description of the invention, figures and claims provided herein.

DEFINITIONS

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without undergoing a compositional change due to physical fractionation or chemical conversion.

The term "bypass" means that the object is out of downstream communication with a bypassing subject at least to the extent of bypassing.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottoms temperature is the liquid bottoms outlet temperature. Overhead lines and bottoms lines refer to the net lines from the column downstream of any reflux or reboil to the column. Stripping columns omit a reboiler at a bottom of the column and instead provide heating requirements and separation impetus from a fluidized inert media such as steam.

As used herein, the term "True Boiling Point" (TBP) means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "T5" or "T95" means the temperature at which 5 volume percent or 95 volume percent, as the case may be, respectively, of the sample boils using ASTM D-86.

As used herein, the term "initial boiling point" (IBP) means the temperature at which the sample begins to boil using ASTM D-86.

As used herein, the term "end point" (EP) means the temperature at which the sample has all boiled off using ASTM D-86.

As used herein, the term "diesel cut point" is between about 343° C. (650° F.) and about 399° C. (750° F.) using the TBP distillation method.

As used herein, the term "diesel boiling range" means hydrocarbons boiling in the range of between about 132° C. (270° F.) and the diesel cut point using the TBP distillation method.

As used herein, the term "diesel conversion" means conversion of feed that boils above the diesel cut point to material that boils at or below the diesel cut point in the diesel boiling range.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "predominant" or "predominate" means greater than 50%, suitably greater than 75% and preferably greater than 90%.

As used herein, the term "a component-rich stream" means that the rich stream coming out of a vessel has a greater concentration of the component than the feed to the vessel.

DETAILED DESCRIPTION

An FCC unit and a hydrocracking unit are integrated to increase the value of the final products by recovering additional feed to the hydrocracking unit from the FCC clarified slurry oil (CSO) product. Cycle oil material in the CSO is separated and used as additional feed to the hydrocracking unit. A vacuum flash drum or vacuum column is used to recover lighter material from the CSO. The recovered overhead product is then sent to the hydrocracking unit in order to make more diesel and/or petrochemical products. The additional feed is converted in the hydrocracking unit to additional lighter products such as gasoline, kerosene, diesel, ethylene, propylene and aromatics.

Figure 1:
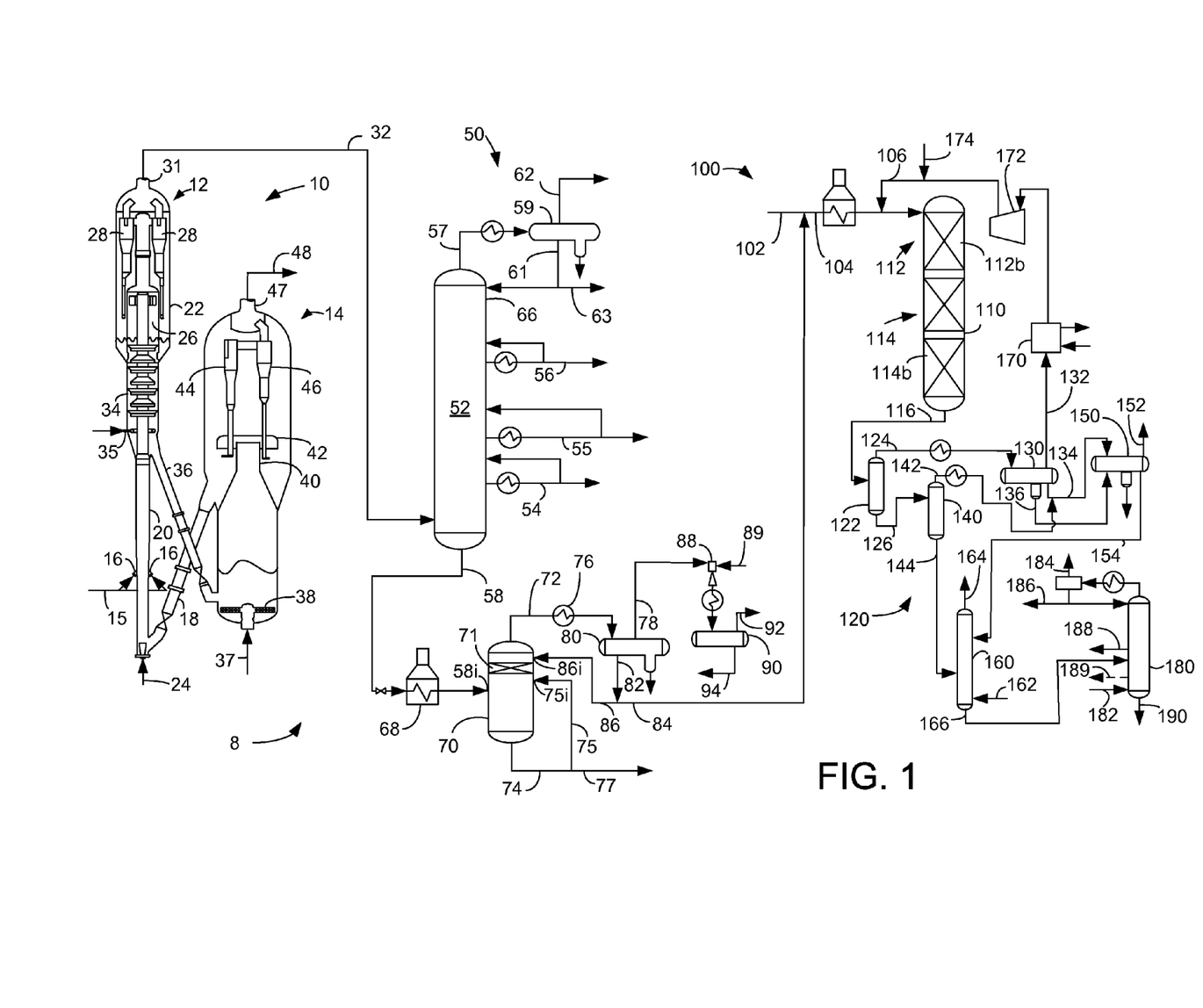
FIG. 1 is a schematic drawing of a FCC unit and a hydrocracking unit.

FIG. 1, wherein like numerals designate like components, illustrates an apparatus and process 8 that is equipped for processing a fresh hydrocarbon feed stream. The apparatus and process 8 generally include an FCC unit 10, an FCC recovery section 50, a hydrocracking unit 100, and a hydrocracking recovery section 120.

The fresh hydrocarbon feed may be introduced in an FCC feed line 15. A conventional FCC feedstock and higher boiling hydrocarbon feedstock are suitable fresh hydrocarbon feed streams. The most common of such conventional fresh hydrocarbon feedstocks is a "vacuum gas oil" (VGO), which is typically a hydrocarbon material having a boiling range with an IBP of around or about 340° C. (644° F.), a T5 between about 340° C. (644° F.) to about 350° C. (662° F.), a T95 between about 555° C. (1031° F.) and about 570° C. (1058° F.) and an EP of around or about 570° C. (1058° F.) prepared by vacuum fractionation of atmospheric residue. Such a fraction is generally low in coke precursors and heavy metal contamination which can serve to contaminate catalyst. Atmospheric residue is a preferred feedstock boiling with an IBP of around or about 340° C. (644° F.), a T5 between about 340° C. (644° F.) and about 360° C. (680° F.) and a T95 of between about 700° C. (1292° F.) and about 900° C. (1652° F.) obtained from the bottom of an atmospheric crude distillation column. Atmospheric residue is generally high in coke precursors and metal contamination. Other heavy hydrocarbon feedstocks which may serve as fresh hydrocarbon feed include heavy bottoms from crude oil, heavy bitumen crude oil, shale oil, tar sand extract, deasphalted residue, products from coal liquefaction, vacuum reduced crudes. Fresh hydrocarbon feedstocks also include mixtures of the above hydrocarbons and the foregoing list is not comprehensive.

FIG. 1 shows a typical FCC unit 10 which includes an FCC reactor 12 comprising a riser 20 and a catalyst regenerator 14. The FCC feed stream in the FCC feed line 15 is fed to the riser 20 via distributors 16 to be contacted with a regenerated cracking catalyst. Regenerated cracking catalyst entering from a regenerated catalyst standpipe 18 is contacted with the FCC feed stream in the riser 20 of the FCC reactor 12. In the riser 20 of the FCC reactor 12, the FCC feed stream is contacted with catalyst to catalytically crack the FCC feed stream to provide a cracked stream.

The contacting of the FCC feed stream with cracking catalyst may occur in the riser 20 of the FCC reactor 12, extending upwardly to the bottom of a reactor vessel 22. The contacting of feed and catalyst is fluidized by gas from a fluidizing line 24. Heat from the catalyst vaporizes the FCC feed stream, and the FCC feed stream is thereafter cracked to lighter molecular weight hydrocarbons in the presence of the cracking catalyst as both are transferred up the riser 20 into the reactor vessel 22. The cracked stream of hydrocarbon products in the riser 20 is thereafter disengaged from the cracking catalyst using cyclonic separators which may include a rough cut separator 26 and one or two stages of cyclones 28 in the reactor vessel 22. A cracked stream of product gases exit the reactor vessel 22 through a product outlet 31 to line 32 for transport to a downstream FCC recovery section 50.

The outlet temperature of the cracked products leaving the riser 20 should be between about 472° C. (850° F.) and about 593° C. (1100° F.). Inevitable side reactions occur in the riser 20 leaving coke deposits on the catalyst that lower catalyst activity. The spent or coked catalyst requires regeneration for further use. Coked catalyst, after separation from the gaseous cracked product hydrocarbons, falls into a stripping section 34 where steam is injected through a nozzle 35 and distributor to purge any residual hydrocarbon vapor. After the stripping operation, the coked catalyst is fed to the catalyst regenerator 14 through a spent catalyst standpipe 36.

FIG. 1 depicts a regenerator 14 known as a combustor. However, other types of regenerators are suitable. In the catalyst regenerator 14, a stream of oxygen-containing gas, such as air, is introduced through an air distributor 38 to contact the coked catalyst, burn coke deposited thereon, and provide regenerated catalyst and flue gas. A stream of air or other oxygen containing gas is fed into the regenerator 14 through line 37. Catalyst and air flow upwardly together along a combustor riser 40 located within the catalyst regenerator 14 and, after regeneration, are initially separated by discharge through a disengager 42. Finer separation of the regenerated catalyst and flue gas exiting the disengager 42 is achieved using first and second stage separator cyclones 44, 46, respectively, within the catalyst regenerator 14. Catalyst separated from flue gas dispenses through diplegs from cyclones 44, 46 while flue gas significantly lighter in catalyst sequentially exits cyclones 44, 46 and exit the regenerator vessel 14 through flue gas outlet 47 in line 48. Regenerated catalyst is recycled back to the reactor riser 20 through the regenerated catalyst standpipe 18.

As a result of the coke burning, the flue gas vapors exiting at the top of the catalyst regenerator 14 in line 48 contain CO, $CO_2$ and $H_2O$, along with smaller amounts of other species. Catalyst regeneration temperature is between about 500° C. (932° F.) and about 900° C. (1652° F.). Both the cracking and regeneration occur at an absolute pressure between about 0.5 and about 5 atmospheres.

In the FCC recovery section 50, the gaseous cracked stream in line 32 is fed to a lower section of an FCC main fractionation column 52. The main fractionation column 52 is in downstream communication with the riser 20 and the FCC reactor 12. Several fractions may be fractionated and taken from the main fractionation column 52 including a CSO stream from the bottom in main bottoms line 58, an optional heavy cycle oil (HCO) stream in line 54, an LCO in line 55 and an optional heavy naphtha stream in line 56. In FIG. 1, a heavy cycle oil (HCO) stream in line 54 may only be pumped around to cool the main fractionation column 52 without an HCO product stream being taken. Gasoline and gaseous light hydrocarbons are removed in a main overhead line 57 from the main fractionation column 52 and condensed before entering a main column receiver 59. An aqueous stream is removed from a boot in the receiver 59. Moreover, a condensed unstabilized, light naphtha stream is removed in a main column receiver bottoms line 61 while a gaseous light hydrocarbon stream is removed in overhead line 62. A portion of the light naphtha stream in bottoms line 61 may be refluxed to the main fractionation column 52 while a light unstabilized naphtha stream is withdrawn in line 63. Both streams in lines 62 and 63 may enter a vapor recovery section downstream of the main fractionation column 52.

The light unstabilized naphtha fraction preferably has an initial boiling point (IBP) in the $C_5$ range; i.e., between about 24° C. (75° F.) and about 35° C. (95° F.), and an end point (EP) at a temperature greater than or equal to about 149° C. (300° F.). The optional heavy naphtha fraction has an IBP just above about 149° C. (300° F.) and an EP at a temperature above about 204° C. (400° F.), preferably between about 200° C. (392° F.) and about 221° C. (430° F.). The LCO stream has an IBP of at least 149° C. (300° F.) if no heavy naphtha cut is taken or at about the EP temperature of the heavy naphtha if a heavy naphtha cut is taken and an EP in a range of about 360° C. (680° F.) to about 382° C. (720° F.). The LCO stream may have a T5 in the range of about 213° C. (416° F.) to about 244° C. (471° F.) and a T95 in the range of about 354° C. (669° F.) to about 377° C. (710° F.). The optional HCO stream has an IBP just above the EP temperature of the LCO stream and an EP in a range of about 385° C. (725° F.) to about 482° C. (900° F.) and preferably about 427° C. (800° F.). The HCO stream may have a T5 in the range of about 332° C. (630° F.) to about 349° C. (660° F.) and a T95 in the range of about 382° C. (720° F.) to about 460° C. (860° F.) and preferably about 404° C. (760° F.). The CSO stream has an IBP just above the EP temperature of the HCO stream or the LCO stream if the HCO stream is not taken and includes everything boiling at a higher temperature. Any or all of lines 54-56 may be cooled and pumped back to the main column 52 to cool the main column typically at a higher location.

A vacuum separator 70 may be in downstream communication with the main bottoms line 58 of the main fractionation column 52. In an aspect, a heater 68 such as a fired heater is on the main bottoms line 58 in downstream communication with the main bottoms line 58 and the main fractionation column 52. The heater 68 can be used to heat the CSO stream to further prepare it for separation in the vacuum separator 70. The fired heater may heat the CSO stream to between about 371° C. (700° F.) to about 410° C. (770° F.). The vacuum separator is in downstream communication with the heater 68. A feed inlet 58*i* to the vacuum separator 70 for the main bottoms line 58 admits CSO to the separator 70.

The vacuum separator 70 may be a fractionation column with or without a reboiler or it may be a simple one-stage flash separator. The vacuum separator 70 separates the slurry oil stream into a cycle oil stream and a heavy stream under vacuum pressure of about 5 and about 25 kPa (absolute) and a temperature between about 332° C. (630° F.) to about 354° C. (670° F.). The cycle oil stream may comprise at least some material boiling in the LCO range and/or at least some material boiling in the HCO range.

In an aspect, the cycle oil stream is comprised in a vaporous separator overhead stream transported in a separator overhead line 72 from a top of the vacuum separator 70 while the heavy stream is in a separator bottoms stream transported in a separator bottoms line 74 from a bottom of the vacuum separator 70. An optional recycle line 75 may be in downstream communication with the separator bottoms line 74 and the separator 70 may be in downstream communication with the recycle line. The recycle line 75 recycles a portion of the heavy stream from the separator bottoms line 74 from a bottom of the separator 70 back to the separator 70. The recycle line 75 recycles to a recycle inlet 75*i* that is above a feed inlet 58*i* of the CSO stream to the separator 70. The net heavy stream comprising concentrated CSO is removed in line 77 and can be sold as fuel oil or as feed to a coker unit or for carbon black production.

A cooler 76 may be in downstream communication with the separator overhead line 72 for cooling and condensing the separator overhead stream. The condensed separator overhead stream enters a receiver 80 in downstream communication with the separator overhead line 72 from a top of the separator 70. The condensed overhead stream is separated in the receiver 80 into the liquid cycle oil stream taken from a bottom of the receiver 80 in a receiver bottoms line 82 and a vaporous receiver overhead stream taken in receiver overhead line 78. The liquid cycle oil stream in the receiver bottoms line 82 is LCO and HCO rich and provides a cycle oil process stream which can be taken to an LCO pool, a diesel pool or to the hydrocracking unit 100 in hydroprocessing feed line 84. The receiver 80 may be operated under vacuum pressure of about 2 and about 10 kPa (absolute) and a temperature between about 37° C. (100° F.) to about 149° C. (300° F.), preferably no more than about 121° C. (250° F.).

The cycle oil stream recovered in the hydroprocessing feed line 84 may comprise about 5 to about 50 vol % and suitably about 20 to about 30 vol % of the CSO stream in main column bottoms line 58. Additionally, the API of the cycle oil stream in line 84 may decrease 1-5 and suitably 2-4 API numbers relative to the CSO stream in main column bottoms line 58.

In an embodiment, if the vacuum separator 70 is a vacuum fractionation column, the liquid cycle oil stream in receiver bottoms line may be split between the cycle oil process stream in a hydroprocessing feed line 84 and a reflux stream in a reflux line 86 for reflux of a portion of the liquid cycle oil stream in the receiver bottoms line 82 from a bottom of the receiver 80 to the vacuum separator 70 through the reflux inlet 86*i*. The reflux line 86 may be in downstream communication with the receiver bottoms line 82 and the vacuum separator 70, and the vacuum separator may be in downstream communication with the reflux line 86. The reflux inlet 86i to the vacuum separator 70 is for the reflux line 86 which is at a higher elevation than the feed inlet 58i to the separator 70 for the main bottoms line 58 and a recycle inlet 75i to the separator 70 for the recycle line 75. In this embodiment, a packing 71 may be disposed in the vacuum column between the recycle inlet 75i and the reflux inlet 86i. Refluxing the liquid cycle oil stream to the vacuum fractionation column enables control of the end point of the cycle oil process stream to satisfy feed requirements to downstream units, such as the hydrocracking unit 100.

The vacuum separator 70 is operated at below atmospheric pressure in the separator overhead line 72. A vacuum generating device 88 such as an eductor or a vacuum pump is in downstream communication with the receiver overhead line 78 of the receiver 80 for pulling a vacuum on the receiver overhead stream from the receiver 80. In an embodiment, when the vacuum generating device 88 is an eductor, the eductor may be in downstream communication with an inert gas stream 89 such as steam which pulls a vacuum on the receiver overhead stream in the receiver overhead line 78. The eductor feeds the inert gas stream mixed with the receiver overhead stream to a condenser. The condensed mixture of the inert gas stream and the receiver overhead stream exit the condenser and enter into a drain drum 90. A vaporous hydrocarbon stream in line 92 from the drain drum 90 may be vented to flare or recovery. A condensed stream of sour water may also be removed from the drain drum in drum bottoms line 94 and taken to water treatment facilities for the FCC unit 10 which is not described.

Because LCO may be recovered from the CSO stream in the main bottoms line 58, additional LCO may be allowed to flow into the CSO stream by reducing the LCO draw in line 55. This allows the main fractionation column 52 to operate at lower bottoms temperature to prevent coking in the main fractionation column. LCO is then recovered in the cycle oil process stream in hydroprocessing feed line 84 avoiding LCO loss and giving more flexibility to the operation of the main fractionation column 52.

The cycle oil process stream may be transported in the hydroprocessing feed line 84 to the hydrocracking unit 100 to hydrocrack at least a portion of the cycle oil process stream over hydrocracking catalyst to provide a diesel product stream and/or petrochemical feedstock. The hydrocracking unit 100 may be in downstream communication with the receiver bottoms line 82. The cycle oil process stream may be mixed with another hydrocarbon feed stream in line 102 to provide a blended hydrocracking feed stream in line 104. The other hydrocarbon feed stream in line 102 may be an LCO stream or it may comprise material having an initial boiling point suitably no less than about 150° C. (302° F.) and preferably no less than about 288° C. (550° F.), such as atmospheric gas oils, VGO, deasphalted, vacuum, and atmospheric residua, coker distillates, straight run distillates, solvent-deasphalted oils, pyrolysis-derived oils, high boiling synthetic oils, HCO, hydrocracked feeds, cat cracker distillates and the like. Suitable feeds may provide an end point after being blended with the cycle oil process stream in hydroprocessing feed line 84 to provide the blended hydrocracking feed stream with an end point of no more than about 482° C. (900° F.), suitably no more than about 468° C. (875° F.) and preferably no more than about 454° C. (850° F.). The T95 of the blended stream may be no more than about 438° C. (820° F.), preferably about 448° C. (840° F.), to about 471° C. (880° F.), preferably about 460° C. (860° F.). The blended hydrocracking feed stream may contain from about 0.1 to about 4 wt % sulfur and 300 to 1800 wppm nitrogen. The blended hydrocracking feed stream may be heated, mixed with a hydrogen stream in line 106 and fed to the hydroprocessing vessel 110.

In an aspect of the present invention, the hydroprocessing vessel 110 may include a hydrotreating reactor 112 to remove nitrogen and sulfur species and to saturate aromatic rings in the hydrocarbon feed stream. In the hydrotreating reactor, between about 60 to about 90 wt % and preferably about 70 to about 80 wt % of the multi-ring aromatics may be saturated to have just one aromatic ring.

In an aspect, the hydrotreating reactor 112 may be a hydrotreating catalyst bed 112b in the hydroprocessing vessel 110. The hydroprocessing vessel 110 may comprise one or more vessels, multiple beds of catalyst in each vessel, and various combinations of hydrotreating catalyst, hydrocracking catalyst, hydrotreating reactors and hydrocracking reactors in one or more vessels. The preheated, hydrocracking feed stream may be hydrotreated in the presence of the hydrogen stream and hydrotreating catalyst in one or more hydrotreating catalyst beds 112b to provide a hydrotreated stream. The hydrotreated stream and unconsumed hydrogen may be transferred to a hydrocracking reactor 114 comprising a hydrocracking catalyst bed 114b without any separation or heating. Hydrogen streams may be injected between or after catalyst beds to provide hydrogen requirements and/or to cool catalyst bed effluent. For example, the hydroprocessing vessel 110 in FIG. 1 is illustrated to have three catalyst beds in one reactor vessel. From zero to two hydrotreating catalyst beds 112b of hydrotreating catalyst may be followed by one to three hydrocracking catalyst beds 114b in hydroprocessing vessel 110. Consequently, a hydrotreating reactor 112 may be in downstream communication with the receiver bottoms line 82 and the hydrocracking reactor 114 may be in downstream communication with the hydrotreating reactor 112.

Typical hydrotreating conditions include an average hydrotreating catalyst bed temperature from about 260° C. (500° F.) to about 426° C. (800° F.), often from about 316° C. (600° F.) to about 426° C. (800° F.), and a hydrogen partial pressure from about 4.1 MPa (600 psig) to about 10.5 MPa (1500 psig), often from about 6.2 MPa (800 psig) to about 8.3 MPa (1400 psig). However, if the hydrotreating reactor 112 is in the same hydroprocessing vessel 110 as the hydrocracking reactor 114, conditions in each will be closer to the same. A typical range of LHSV for the hydrotreating reactor 112 is from about 0.1 to about 10 $hr^{-1}$, often from about 0.5 to about 3 $hr^{-1}$.

Suitable hydrotreating catalysts include those comprising of at least one Group VIII metal, such as iron, cobalt, and nickel, cobalt and/or nickel, and at least one Group VI metal, such as molybdenum and tungsten, on a high surface area support material such as a refractory inorganic oxide such as alumina and optionally with silica amounting to no more than 5 wt % silica. A representative hydrotreating catalyst therefore comprises a metal selected from the group consisting of nickel, cobalt, tungsten, molybdenum, and mixtures thereof, such as a mixture of cobalt and molybdenum, deposited on a refractory inorganic oxide support such as alumina.

The hydrotreated effluent stream or the hydrocracking feed stream is hydrocracked in the presence of hydrocracking catalyst and the hydrogen stream in the hydrocracking reactor 114 to provide a hydrocracked effluent stream in hydrocracked effluent line 116. In some aspects, the hydrocracking reaction provides diesel conversion of at least about 30 vol % and typically no greater than about 60 vol % of the hydrocracking feed. At hydrocracking conditions, the feed is selectively converted to products such as diesel, kerosene, naphtha and gas to provide an upgraded product stream. Pressure may be moderate to allow opening of all but one of the rings. As a result of being hydrocracked, the upgraded hydrocarbon product has a reduced average molecular weight relative to the hydrocracker feed. For example, in the case of a blended hydrocracking feed stream, in an aspect, prior to hydrotreating is predominantly 2-ring aromatic compounds and multi-ring aromatic compounds, the hydrocracked product may comprise at least about 40% by weight, and often at least about 50% by weight, mono-ring aromatic compounds. In a preferred embodiment, the hydrocracked effluent stream comprises or consists essentially of a mixture of the fuel components naphtha and diesel fuel. In the hydrocracking reactor 114, between about 60 to about 90 wt % and preferably about 70 to about 80 wt % of the multi-ring compounds may be cracked open to have just one ring intact. Also, due to desulfurization resulting from hydrotreating of all or a portion of the hydrocracking feed stream, the hydrocracked effluent stream may comprise or consist essentially of naphtha and diesel fuel that meet sulfur specifications for ultra low sulfur naphtha and ultra low sulfur diesel.

Hydrocracking of the hydrocracking feed stream may be carried out in the presence of a hydrocracking catalyst and hydrogen. Representative hydrocracking conditions include an average hydrocracking catalyst bed temperature from about 260° C. (500° F.) to about 426° C. (800° F.), often from about 316° C. (600° F.) to about 426° C. (800° F.); a hydrogen partial pressure from about 4.1 MPa (600 psig) to about 10.5 MPa (1500 psig), preferably from about 6.2 MPa (800 psig) to about 9.0 MPa (1300 psig); an LHSV from about 0.1 $hr^{-1}$ to about 30 $hr^{-1}$, often from about 0.5 $hr^{-1}$ to about 3 $hr^{-1}$; and a hydrogen circulation rate from about 2000 standard $ft^3$ per barrel (337 normal m3/m3) to about 25,000 standard $ft^3$ per barrel (4200 normal m3/m3), often from about 5000 standard $ft^3$ per barrel (840 normal m3/m3) to about 15,000 standard $ft^3$ per barrel (2530 normal m3/m3).

The hydrocracking catalysts may utilize amorphous silica-alumina and/or zeolite as cracking bases. A beta zeolite having a silica-to-alumina molar ratio of less than 30:1 and an $SF_6$ adsorption capacity of at least 28% may be a suitable cracking base. Cracking bases comprising amorphous silica-alumina should have a silica content of 40 wt % or more The zeolite cracking bases are sometimes referred to in the art as molecular sieves and are usually composed of silica, alumina and one or more exchangeable cations such as sodium, magnesium, calcium, rare earth metals, etc. They are further characterized by crystal pores of relatively uniform diameter between about 4 and about 14 angstroms. It is preferred to employ zeolites having a relatively high silica-to-alumina molar ratio between about 3 and about 12. Suitable zeolites found in nature include, for example, mordenite, stilbite, heulandite, ferrierite, dachiardite, chabazite, erionite and faujasite. Suitable synthetic zeolites include, for example, the B, X, Y and L crystal types, e.g., synthetic faujasite and mordenite. The preferred zeolites are those having crystal pore diameters between about 8 to 12 angstroms, wherein the silica-to-alumina molar ratio is about 4 to 6. One example of a zeolite falling in the preferred group is synthetic Y molecular sieve.

The naturally occurring zeolites are normally found in a sodium form, an alkaline earth metal form, or mixed forms. The synthetic zeolites are nearly always prepared first in the sodium form. In any case, for use as a cracking base it is preferred that most or all of the original zeolitic monovalent metals be ion-exchanged with a polyvalent metal and/or with an ammonium salt followed by heating to decompose the ammonium ions associated with the zeolite, leaving in their place hydrogen ions and/or exchange sites which have actually been decationized by further removal of water. Hydrogen or "decationized" Y zeolites of this nature are more particularly described in U.S. Pat. No. 3,130,006.

Mixed polyvalent metal-hydrogen zeolites may be prepared by ion-exchanging first with an ammonium salt, then partially back exchanging with a polyvalent metal salt and then calcining. In some cases, as in the case of synthetic mordenite, the hydrogen forms can be prepared by direct acid treatment of the alkali metal zeolites. In one aspect, the preferred cracking bases are those which are at least about 10 wt %, and preferably at least about 20 wt %, metal-cation-deficient, based on the initial ion-exchange capacity. In another aspect, a desirable and stable class of zeolites is one wherein at least about 20 wt % of the ion exchange capacity is satisfied by hydrogen ions.

The hydrogenation metals deposited on the base of the hydrocracking catalysts are those of Group VIII, i.e., iron, cobalt, nickel, ruthenium, rhodium, palladium, osmium, iridium and platinum. In addition to these metals, other promoters may also be employed in conjunction therewith, including the metals of Group VIB, e.g., molybdenum and tungsten. The amount of hydrogenation metal in the catalyst can vary within wide ranges. Broadly speaking, any amount between about 0.05 percent and about 30 percent by weight may be used. In the case of the noble metals, it is normally preferred to use about 0.05 to about 2 wt %.

The foregoing catalysts may be employed in undiluted form, or the powdered catalyst may be mixed and copelleted with other relatively less active catalysts, diluents or binders such as alumina, silica gel, silica-alumina cogels, activated clays and the like in proportions ranging between about 5 and about 90 wt %. These diluents may be employed as such or they may contain a minor proportion of an added hydrogenating metal such as a Group VIB and/or Group VIII metal. Additional metal promoted hydrocracking catalysts may also be utilized in the process of the present invention which comprises, for example, aluminophosphate molecular sieves, MFI zeolites, crystalline chromosilicates and other crystalline silicates.

A hydrocracked effluent exits the hydrocracking reactor 114 in the hydrocracked effluent line 116. A hydrocracking recovery section 120 may be provided in downstream communication with the hydrocracked effluent line 116. The hydrocracked effluent stream may be cooled and separated in a hot separator 122. The hot separator 122 separates the hydrocracked effluent to provide a vaporous hydrocarbonaceous hot separator overhead stream in an overhead line 124 and a liquid hydrocarbonaceous hot separator bottoms stream in a bottoms line 126. The hot separator 122 is in direct downstream communication with the hydrocracking reactor 114 The hot separator 122 operates at about 177° C. (350° F.) to about 371° C. (700° F.). The hot separator 122 may be operated at a slightly lower pressure than the hydrocracking reactor 114 accounting for pressure drop of intervening equipment.

The vaporous hydrocarbonaceous hot separator overhead stream in the overhead line 124 may be cooled before entering a cold separator 130. To prevent deposition of ammonium bisulfide or ammonium chloride salts in the line 124 transporting the hot separator overhead stream, a suitable amount of wash water (not shown) may be introduced into line 124.

The cold separator 130 serves to separate hydrogen from hydrocarbon in the hydrocracking effluent for recycle to the hydroprocessing reactor vessel 110. The vaporous hydrocarbonaceous hot separator overhead stream may be separated in the cold separator 130 to provide a vaporous cold separator overhead stream comprising a hydrogen-rich gas stream in an overhead line 132 and a liquid cold separator bottoms stream in the bottoms line 134. The cold separator 130, therefore, is in downstream communication with the overhead line 124 of the hot separator 122. The cold separator 130 may be operated at about 100° F. (38° C.) to about 150° F. (66° C.) and just below the pressure of the hydrocracking reactor 114 and the hot separator 122 accounting for pressure drop of intervening equipment to keep hydrogen and light gases in the overhead and normally liquid hydrocarbons in the bottoms. The cold separator 130 may also have a boot for collecting an aqueous phase in line 136.

The liquid hydrocarbonaceous stream in the hot separator bottoms line 134 may be let down in pressure and flashed in a hot flash drum 140 to provide a hot flash overhead stream of light ends in an overhead line 142 and a heavy liquid stream in a hot flash bottoms line 144. The hot flash drum 126 may be operated at the same temperature as the hot separator 122 but at a lower pressure. The heavy liquid stream in bottoms line 144 may be stripped of gases in a stripping column 160.

In an aspect, the liquid hydroprocessing effluent stream in the cold separator bottoms line 134 may be let down in pressure and flashed in a cold flash drum 150. The cold flash drum may be in downstream communication with a bottoms line 134 of the cold separator 128. In a further aspect, the vaporous hot flash overhead stream in overhead line 142 may be cooled and also separated in the cold flash drum 150. The cold flash drum 150 may separate the cold separator liquid bottoms stream in line 134 and the hot flash vaporous overhead stream in overhead line 142 to provide a cold flash overhead stream of light ends in overhead line 152 and a cold flash bottoms stream in a bottoms line 154. The cold flash bottoms stream in bottoms line 154 may be introduced to the stripping column 160. In an aspect, the stripping column 160 may be in downstream communication with the cold flash bottoms line 154 and the hot flash bottoms line 144.

The cold flash drum 150 may be in downstream communication with the bottoms line 134 of the cold separator 130, the overhead line 142 of the hot flash drum 140 and the hydrocracking reactor 114. In an aspect, the hot flash overhead line 142 joins the cold separator bottoms line 134 which feeds the hot flash overhead stream and the cold separator bottoms stream together to the cold flash drum 150. The cold flash drum 150 may be operated at the same temperature as the cold separator 130 but typically at a lower pressure. The aqueous stream in line 136 from the boot of the cold separator 130 may also be directed to the cold flash drum 150. A flashed aqueous stream is removed from a boot in the cold flash drum 150.

The vaporous cold separator overhead stream comprising hydrogen in the overhead line 132 is rich in hydrogen. The cold separator overhead stream in overhead line 132 may be passed through a scrubbing tower 170 to remove hydrogen sulfide and ammonia by use of an absorbent such as an amine absorbent. The scrubbed hydrogen-rich stream may be compressed in a recycle compressor 172 to provide a recycle hydrogen stream and supplemented with a make-up hydrogen stream from line 174 to provide the hydrogen stream in hydrogen line 106.

The hot flash bottom stream in hot flash bottoms line 144 and the cold flash bottoms stream in the cold flash bottoms line 154 may be fed to the stripper column 160 to be stripped of light gases such as hydrogen sulfide. The cold flash bottoms stream may enter the stripping column 160 at a higher elevation than the hot flash bottoms stream 154. The hydrocracking effluent in the hot flash bottoms stream and the cold flash bottoms stream may be stripped in the stripping column 160 with a stripping media which is an inert gas such as steam from line 162 to provide an off-gas stream of hydrogen, hydrogen sulfide, steam and other light gases in an overhead line 164 for further treating. The stripper column 160 may be operated with a bottoms temperature between about 160° C. (320° F.) and about 360° C. (680° F.) and an overhead pressure of about 0.5 MPa (gauge) (73 psig) to about 2.0 MPa (gauge) (292 psig).

A stripped hydrocracked stream is produced in a stripper bottoms line 166. At least a portion of the stripped hydrocracked stream in bottoms line 166 may be fed to a product fractionation column 180. Consequently, the product fractionation column 180 is in downstream communication with the stripper bottoms line 166 of the stripper column 160.

The product fractionation column 180 may be in downstream communication with the hydrocracking reactor 114 for separating portions of the hydrocracking effluent stream into product streams. The hydroprocessing fractionation column 180 fractionates the stripped hydrocracking effluent by use of an inert stripping media such as steam from line 182. The product streams produced by the hydroprocessing fractionation column 180 may include an overhead LPG stream in overhead line 184, a naphtha stream in line 186, a kerosene stream carried in line 188 from a side outlet and a diesel stream in a bottoms line 190. If heavier feeds are fed to the hydroprocessing reactor 110, the diesel stream may be withdrawn from an additional, optional side outlet in line 189 and an unconverted oil stream may be withdrawn in the bottoms line 190 which may be recycled to the FCC unit 10 or recycled to the hydroprocessing reactor 110. The fractionation overhead stream may be condensed and separated in a receiver with a portion of the condensed liquid being refluxed back to the hydroprocessing fractionation column 180. The net naphtha stream in line 186 may require further processing such as in a naphtha splitter column before blending in the gasoline pool or it may be fed to a steam cracker for petrochemical production. The product fractionation column 180 may be operated with a bottoms temperature between about 288° C. (550° F.) and about 370° C. (700° F.) and at an overhead pressure between about 30 kPa (gauge) (4 psig) to about 200 kPa (gauge) (29 psig).

If aromatics recovery is desired over fuel production, portions of the naphtha stream in line 186 and the diesel stream in line 189 or 190 from the product fractionation column 180 may routed to a transalkylation unit for the production of xylenes.

Figure 2:
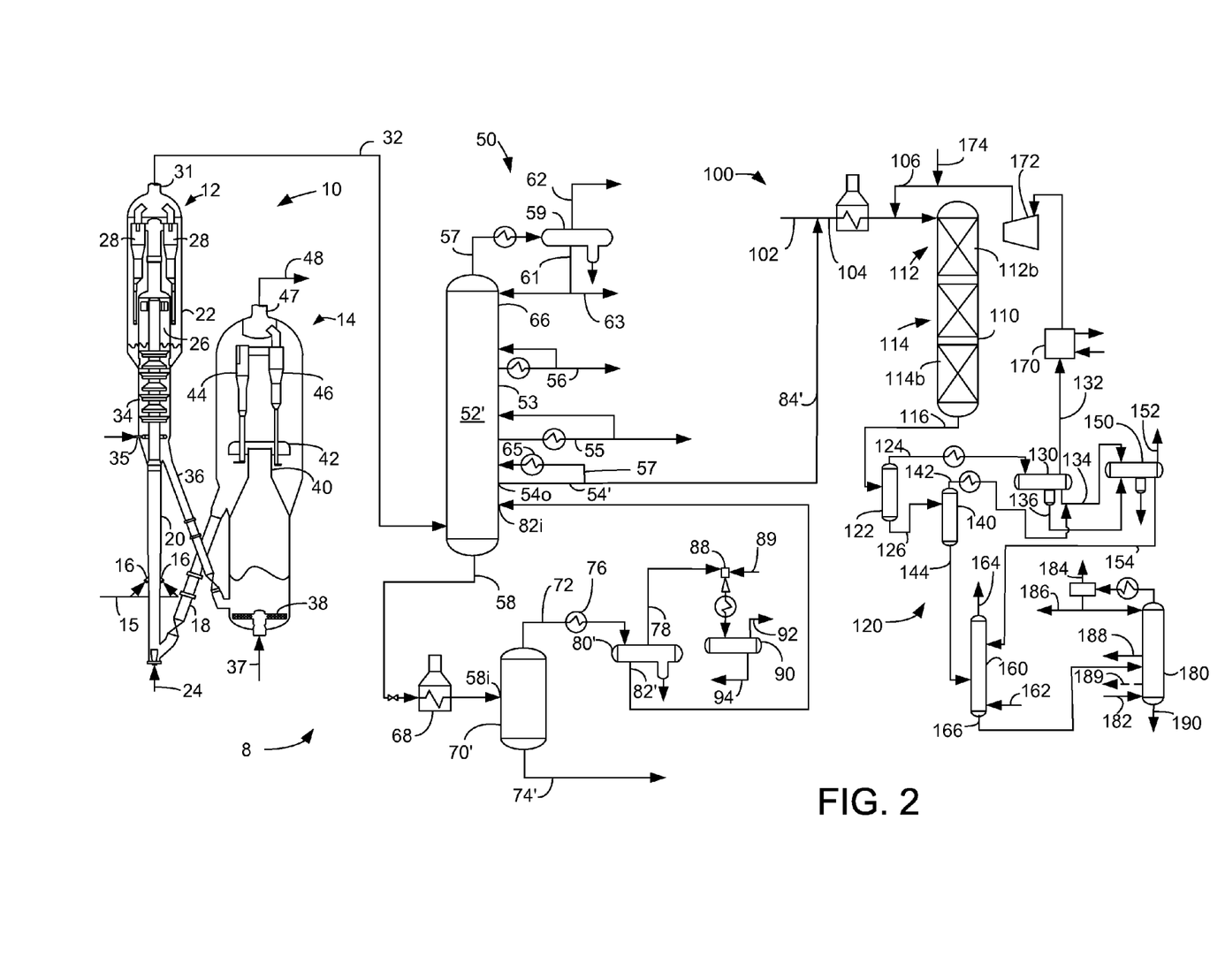
FIG. 2 is schematic drawing of an alternative embodiment of FIG. 1.

FIG. 2 illustrates an embodiment in which recovered light material is recycled to the main column 52'. Many of the elements in FIG. 2 have the same configuration as in FIG. 1 and bear the same reference number. Elements in FIG. 2 that correspond to elements in FIG. 1 but have a different configuration bear the same reference numeral as in FIG. 1 but are marked with a prime symbol (').

In FIG. 2, a main fractionation column 52' is in downstream communication with the FCC reactor 10. A vacuum separator 70' may be in downstream communication with a main bottoms line 58 of the main fractionation column 52'. In an aspect, a heater 68 such as a fired heater may be on the main bottoms line 58 in downstream communication with the main bottoms line 58 and the main fractionation column 52'. The heater 68 can be used to heat the CSO stream to further prepare it for separation in the vacuum separator 70. The fired heater may heat the CSO stream to between about 371° C. (700° F.) to about 410° C. (770° F.). The vacuum separator 70' is in downstream communication with the heater 68. A feed inlet 58*i* to said vacuum separator 70' for the main bottoms line 58 admits CSO to the separator 70.

The vacuum separator 70 may be a fractionation column or it may be a simple one-stage flash separator. The vacuum separator 70' separates the slurry oil stream into a cycle oil stream and a heavy stream under vacuum pressure of about 5 and about 25 kPa (absolute) and a temperature between about 332° C. (630° F.) to about 354° C. (670° F.).

The heavy stream is transported from the separator 70' in a separator bottoms line 74' and can be sold as fuel oil or as feed to a coker unit or to make carbon black. The cycle oil stream is comprised in an overhead stream of the vacuum separator 70' in a separator overhead line 72. A cooler 76 is in downstream communication with the separator overhead line 72. The overhead stream is condensed in the cooler 76 and separated in a receiver 80'.

The condensed separator overhead stream enters the receiver 80' which is in downstream communication with the separator overhead line 72 of the vacuum separator 70'. The condensed overhead stream is separated in the receiver 80' into the liquid cycle oil stream taken from a bottom of the receiver 80' in a receiver bottoms line 82'. A vaporous receiver overhead stream is taken in receiver overhead line 78. The liquid cycle oil stream in the receiver bottoms line 82' is LCO and HCO rich and provides a cycle oil process stream. The receiver 80' may be operated under vacuum pressure of about 2 and about 10 kPa (absolute) and a temperature between about 37° C. (100° F.) to about 149° C. (300° F.), preferably no more than about 121° C. (250° F.).

The vacuum separator 70' is operated at below atmospheric pressure in the separator overhead line 72. A vacuum generating device 88 such as an eductor may be in downstream communication with the receiver overhead line 78 of the receiver 80 for pulling a vacuum on the receiver overhead stream from the receiver 80 as explained with respect to FIG. 1.

The embodiment of FIG. 2 has the main fractionation column 52' in downstream communication with the vacuum separator 80' and specifically with the receiver bottoms line 82' of the receiver 80'. The receiver bottoms line 82' refluxes the cycle oil stream to the main fractionation column 52'. A reflux inlet 82i to the main fractionation column 52' for the receiver bottoms line 82' may be in downstream communication with the vacuum separator 70'. Additionally, the main fractionation column 52' also may be in downstream communication with the separator overhead line 72 of the vacuum separator 70'. The cycle oil process stream is re-fractionated in the main fractionation column to remove a heavy tail of higher boiling materials from the cycle oil process stream. The reflux inlet 82i may be located at an elevation above the bottom of the main fractionation column 52' but at a lower elevation than a side outlet 54o of the main fractionation column. The side outlet 54o may be for withdrawing a cycle oil stream from a side 53 of the main fractionation column 52' from the side outlet 54o that is at a higher elevation than an inlet 82i of the cycle oil process stream refluxed to the main fractionation column. The side outlet 54o is preferably a liquid draw of a liquid cycle oil stream from the main fractionation column 52'.

The cycle oil stream may be withdrawn from the side 53 of the main fractionation column 52' in a cycle oil line 54' and split into a portion in a return stream in a return line 57 and another portion in a hydroprocessing feed stream in a hydroprocessing feed line 84'. A return line 57 to said main fractionation column may be in downstream communication with the side outlet 54o. A hydrocracking unit 100 is in downstream communication with the side outlet 54o of the main fractionation column 52'. The portion of the cycle oil stream from the main fractionation column 52' in the hydroprocessing feed line 84' may be hydrocracked in the hydrocracking unit 100, and the other portion of the cycle oil stream in the return line may be returned to the main fractionation column 52'. A cooler 65 on the return line 57 cools the other portion of the cycle oil stream comprising the return stream before it is returned to the main fractionation column 52' after the hydroprocessing feed stream in line 84' is taken from the cycle oil stream in cycle oil line 54'.

The hydroprocessing feed stream comprising a cycle oil stream from the main fractionation column in hydroprocessing feed line 84' may be hydrocracked in the hydrocracking unit 100 as described with respect to FIG. 1. A hydrotreating reactor 112 may be in communication with the side outlet 54o of the main fractionation column 52' and a hydrocracking reactor 114 may be in downstream communication with said hydrotreating reactor 112. As explained with respect to FIG. 1, a diesel stream and/or an aromatics stream may be recovered from the hydrocracked cycle oil stream. All aspects of the embodiments of FIG. 1 are applicable to FIG. 2 unless stated otherwise.

EXAMPLES

Example 1

The described embodiment was simulated to demonstrate its usefulness. The first base case refinery sends hydrotreated atmospheric resid feed to an FCC unit at a rate of 603 m$^3$/h with 166 m$^3$/h of LCO and diesel that is fed to a hydrocracking unit. The base case refinery is equipped to upgrade and produce aromatics or feedstock for a steam cracker for making ethylene and propylene. By using a vacuum column or vacuum flash drum to recover light material from FCC, CSO product, approximately 25 vol % of cycle oil material can be recovered relative to the CSO product. The cycle oil material is then sent to the hydrocracking unit, to increase hydrocracking unit feed rate by 3.0 vol % to 171 m$^3$/h. Due to the increased feed rate to the hydrocracking unit, total product yield from the steam cracker for light olefins and the hydrocracking unit for aromatics will increase as shown in Table 1.

TABLE 1

| Stream | Increase, wt % |
| --- | --- |
| Hydrocracking feed | 3.4 |
| Ethylene | 3.8 |
| Propylene | 3.9 |
| Benzene | 4.1 |
| Toluene | 4.1 |
| Xylenes | 4.1 |

Example 2

In a second base case, the refinery is equipped for fuels production. The second base case refinery sends hydrotreated atmospheric resid feed to an FCC unit at a rate of 576 m$^3$/h with 364 m3/h of LCO and diesel that is fed to a hydrocracking unit. By using a vacuum column or vacuum flash drum to recover light material from FCC, CSO product, approximately 25 vol % of cycle oil material can be recovered relative to the CSO product. The light material is then sent to the hydrocracking unit, to increase hydrocracking unit feed rate by 1.3 vol % to 369 m$^3$/h. Due to the increased feed rate to the hydrocracking unit, total product yield from the hydrocracking unit will increase as shown in Table 2.

TABLE 2

| Stream | Increase, wt % |
|---|---|
| Hydrocracking feed | 1.5 |
| 95 RON Euro V Gasoline | 2.5 |
| Kerosene/Jet Fuel | 1.3 |
| Euro V Diesel | 0.9 |
| LPG | 4.1 |

Example 3

Various embodiments of the present invention were simulated to assess the additional feed produced for the hydrocracking unit.

In a first simulation, 38,208 kg/hr of CSO at 363° C. (685° F.) is fed to a vacuum flash drum.

In a second simulation, the same feed is sent to a vacuum fractionation column without a reboiler. A reflux stream of 1,956 kg/hr of a liquid cycle oil stream taken from a bottom of the overhead receiver in a receiver bottoms line is refluxed to the vacuum fractionation column.

In a third simulation, the same feed is heated to 382° C. (720° F.) in a fired heater before being fed to a vacuum fractionation column and a reflux stream of only 1059 kg/hr a liquid cycle oil stream taken from a bottom of the overhead receiver in a receiver bottoms line is refluxed to the vacuum fractionation column.

In a fourth simulation, 38,301 kg/hr of CSO at 363° C. (685° F.) is fed to a vacuum flash drum, but 5,777 kghr of the cycle oil process stream from the overhead receiver bottoms is refluxed to the main fractionation column. The hydrocracking feed is taken as a portion of the HCO stream withdrawn from a side of the main fractionation column.

A comparison of the additional cycle oil, hydrocracking feeds are shown in Table 3. Boiling point properties are provided using TBP.

TABLE 3

| Simulation | Flow rate, kg/hr | Fraction of CSO, wt % | T95, ° C. | End Point, ° C. |
|---|---|---|---|---|
| 1 | 7584 | 20 | 490 | 557 |
| 2 | 2083 | 5 | 416 | 448 |
| 3 | 8614 | 23 | 471 | 510 |
| 4 | 5777 | 15 | 419 | 456 |

These embodiments produce suitable hydrocracking feedstock in substantial quantities that may be hydrocracked alone or blended with other hydrocracking feed for hydrocracking to upgraded products.

Specific Embodiments

While the following is described in conjunction with specific embodiments, it will be understood that this description is intended to illustrate and not limit the scope of the preceding description and the appended claims.

A first embodiment of the invention is a process for catalytically cracking hydrocarbons comprising feeding a hydrocarbon feed stream to an FCC reactor and contacting the hydrocarbon feed stream with catalyst to catalytically crack the hydrocarbon feed stream to provide a cracked stream; disengaging the catalyst from the cracked stream; fractionating the cracked stream into products including a slurry oil stream from a bottom of a main fractionation column; separating the slurry oil stream into a cycle oil stream and a heavy stream under vacuum pressure; and hydrocracking at least a portion of the cycle oil stream over hydrocracking catalyst to provide an upgraded stream. An embodiment of the invention is one, any or all of prior embodiments in this paragraph through the first embodiment in this paragraph further comprising heating the slurry oil stream before the separation step. An embodiment of the invention is one, any or all of prior embodiments in this paragraph up through the first embodiment in this paragraph further comprising recycling a portion of the heavy stream to the separation step. An embodiment of the invention is one, any or all of prior embodiments in this paragraph up through the first embodiment in this paragraph further comprising recycling a portion of the heavy stream from a separator bottoms line to a recycle inlet that is above an inlet of the slurry oil stream to the separator. An embodiment of the invention is one, any or all of prior embodiments in this paragraph up through the first embodiment in this paragraph further comprising condensing a separator overhead stream from an overhead of the separator, separating the condensed overhead stream in a receiver and taking the cycle oil stream from a bottom of a receiver. An embodiment of the invention is one, any or all of prior embodiments in this paragraph up through the first embodiment in this paragraph further comprising pulling a vacuum on a receiver overhead stream from the receiver and feeding it to a drain drum. An embodiment of the invention is one, any or all of prior embodiments in this paragraph up through the first embodiment in this paragraph further comprising refluxing a portion of the cycle oil stream to the separator vessel to a reflux inlet that is above the recycle inlet. An embodiment of the invention is one, any or all of prior embodiments in this paragraph up through the first embodiment in this paragraph wherein the hydrocracking step is conducted in a hydrocracking reactor in which hydrocracking is the predominant reaction. An embodiment of the invention is one, any or all of prior embodiments in this paragraph up through the first embodiment in this paragraph further comprising increasing a yield of diesel compared to a yield without hydrocracking the cycle oil stream.

A second embodiment of the invention is a process for catalytically cracking hydrocarbons comprising feeding a hydrocarbon feed stream to an FCC reactor and contacting the hydrocarbon feed stream with catalyst to catalytically crack the hydrocarbon feed stream to provide a cracked stream; disengaging the catalyst from the cracked stream; fractionating the cracked stream into products including a slurry oil stream from a bottom of a main fractionation column; separating the slurry oil stream into a separator overhead stream and a heavy stream under vacuum pressure in a separator vessel; condensing the separator overhead stream; separating the condensed overhead stream in a receiver; taking the cycle oil stream from a bottom of the receiver; and hydrocracking at least a portion of the cycle oil stream over hydrocracking catalyst to provide an upgraded product stream. An embodiment of the invention is one, any or all of prior embodiments in this paragraph up through the second embodiment in this paragraph further comprising heating the slurry oil stream before the separation step. An embodiment of the invention is one, any or all of prior embodiments in this paragraph up through the second embodiment in this paragraph further comprising recycling the heavy stream to the separation step. An embodiment of the invention is one, any or all of prior embodiments in this paragraph up through the second embodiment in this paragraph further comprising recycling a portion of the heavy stream from a bottom of a separator vessel to a recycle inlet that is above an inlet of the slurry oil stream to the separator vessel. An embodiment of the invention is one, any or all of prior embodiments in this paragraph up through the second embodiment in this paragraph further comprising pulling a vacuum on a receiver overhead stream from the receiver and feeding it to a drain drum. An embodiment of the invention is one, any or all of prior embodiments in this paragraph up through the second embodiment in this paragraph further comprising refluxing a portion of the cycle oil stream to the separator vessel to a reflux inlet that is above the recycle inlet. An embodiment of the invention is one, any or all of prior embodiments in this paragraph up through the second embodiment in this paragraph wherein the hydrocracking step is conducted in a hydrocracking reactor in which hydrocracking is the predominant reaction. An embodiment of the invention is one, any or all of prior embodiments in this paragraph up through the second embodiment in this paragraph further comprising increasing a yield of diesel compared to a yield without hydrocracking the cycle oil stream.

A third embodiment of the invention is a process for catalytically cracking hydrocarbons comprising feeding a hydrocarbon feed stream to an FCC reactor and contacting the hydrocarbon feed stream with catalyst to catalytically crack the hydrocarbon feed stream to provide a cracked stream; disengaging the catalyst from the cracked stream; fractionating the cracked stream into products including a slurry oil stream from a bottom of a main fractionation column; separating the slurry oil stream into a cycle oil stream and a heavy stream under vacuum pressure in a separator vessel; recycling the heavy stream to the separation step; and hydrocracking at least a portion of the cycle oil stream over hydrocracking catalyst to provide an upgraded product stream. An embodiment of the invention is one, any or all of prior embodiments in this paragraph up through the third embodiment in this paragraph further comprising condensing a separator overhead stream from a separator vessel; separating the condensed overhead stream in a receiver; and taking the cycle oil stream from a bottom of the receiver. An embodiment of the invention is one, any or all of prior embodiments in this paragraph up through the third embodiment in this paragraph further comprising pulling a vacuum on a receiver overhead stream from the receiver.

A fourth embodiment of the invention is an apparatus for producing an upgraded product comprising an FCC reactor; a main fractionation column in communication with the FCC reactor; a separator in communication with a main bottoms line of the main fractionation column; a receiver in communication with a separator overhead line of the separator; a vacuum generation device in communication with a receiver overhead line of the receiver; and a receiver bottoms line of the receiver for providing an HCO process stream. An embodiment of the invention is one, any or all of prior embodiments in this paragraph up through the fourth embodiment in this paragraph further comprising a hydrocracking unit in communication with the receiver bottoms line. An embodiment of the invention is one, any or all of prior embodiments in this paragraph up through the fourth embodiment in this paragraph further comprising a hydrotreating reactor in communication with the receiver bottoms line and a hydrocracking reactor is in downstream communication with the hydrotreating reactor. An embodiment of the invention is one, any or all of prior embodiments in this paragraph up through the fourth embodiment in this paragraph wherein the separator is a vacuum fractionation column. An embodiment of the invention is one, any or all of prior embodiments in this paragraph up through the fourth embodiment in this paragraph further comprising a recycle line in downstream communication with a separator bottoms line and the separator is in downstream communication with the recycle line. An embodiment of the invention is one, any or all of prior embodiments in this paragraph up through the fourth embodiment in this paragraph further comprising a recycle inlet to the separator for the recycle line, the recycle inlet being at a higher elevation than a feed inlet to the separator for the main bottoms line. An embodiment of the invention is one, any or all of prior embodiments in this paragraph up through the fourth embodiment in this paragraph further comprising a reflux line in communication with the receiver bottoms line and the separator is in downstream communication with the reflux line. An embodiment of the invention is one, any or all of prior embodiments in this paragraph up through the fourth embodiment in this paragraph further comprising a reflux inlet to the separator for the reflux line, the reflux inlet being at a higher elevation than a feed inlet to the separator for the main bottoms line and than a recycle inlet to the separator for the recycle line. An embodiment of the invention is one, any or all of prior embodiments in this paragraph up through the fourth embodiment in this paragraph further comprising a heater in downstream communication with the main fractionation column and the separator is in downstream communication with the heater. An embodiment of the invention is one, any or all of prior embodiments in this paragraph up through the fourth embodiment in this paragraph further comprising a condenser in communication with a separator overhead line.

A fifth embodiment of the invention is an apparatus for producing an upgraded product comprising an FCC reactor; a main fractionation column in communication with the FCC reactor; a separator in communication with a main bottoms line of the main fractionation column; a receiver in communication with a separator overhead line of the separator; an eductor in communication with a receiver overhead line of the receiver; a receiver bottoms line of the receiver for providing a HCO process stream; and a hydrocracking unit in downstream communication with the receiver bottoms line. An embodiment of the invention is one, any or all of prior embodiments in this paragraph up through the fifth embodiment in this paragraph further comprising a hydrotreating reactor in communication with the receiver bottoms line and a hydrocracking reactor is in downstream communication with the hydrotreating reactor. An embodiment of the invention is one, any or all of prior embodiments in this paragraph up through the fifth embodiment in this paragraph wherein the separator is a vacuum fractionation column. An embodiment of the invention is one, any or all of prior embodiments in this paragraph up through the fifth embodiment in this paragraph further comprising a recycle line in downstream communication with a separator bottoms line and the separator is in downstream communication with the recycle line. An embodiment of the invention is one, any or all of prior embodiments in this paragraph up through the fifth embodiment in this paragraph further comprising a reflux line in communication with the receiver bottoms line and the separator is in downstream communication with the reflux line.

A sixth embodiment of the invention is an apparatus for producing an upgraded product comprising an FCC reactor; a main fractionation column in communication with the FCC reactor; a separator in communication with a main bottoms line of the main fractionation column; and a hydrocracking unit in downstream communication with the separator. An embodiment of the invention is one, any or all of prior embodiments in this paragraph up through the sixth embodiment in this paragraph further comprising a receiver in communication with a separator overhead line of the separator and the hydrocracking unit is in downstream communication with a receiver bottoms line of the receiver. An embodiment of the invention is one, any or all of prior embodiments in this paragraph up through the sixth embodiment in this paragraph further comprising an eductor in communication with a receiver overhead line of the receiver. An embodiment of the invention is one, any or all of prior embodiments in this paragraph up through the sixth embodiment in this paragraph wherein the separator is a vacuum fractionation column. An embodiment of the invention is one, any or all of prior embodiments in this paragraph up through the sixth embodiment in this paragraph further comprising a recycle line in downstream communication with a separator bottoms line and the separator is in downstream communication with the recycle line.

A seventh embodiment of the invention is a process for recovering catalytically cracked hydrocarbons comprising feeding a hydrocarbon feed stream to an FCC reactor and contacting the hydrocarbon feed stream with catalyst to catalytically crack the hydrocarbon feed stream to provide a cracked stream; disengaging the catalyst from the cracked stream; fractionating the cracked stream into products including a slurry oil stream from a bottom of a main fractionation column; separating the slurry oil stream into a separator overhead stream and a heavy stream under vacuum pressure in a separator; condensing the separator overhead stream; separating the condensed overhead stream in a receiver; and recovering a cycle oil stream from a bottom of the receiver. An embodiment of the invention is one, any or all of prior embodiments in this paragraph up through the seventh embodiment in this paragraph further comprising heating the slurry oil stream before the separation step. An embodiment of the invention is one, any or all of prior embodiments in this paragraph up through the seventh embodiment in this paragraph further comprising recycling a portion of the heavy stream to the separation step. An embodiment of the invention is one, any or all of prior embodiments in this paragraph up through the seventh embodiment in this paragraph further comprising recycling a portion of the heavy stream from a bottom of a separator vessel to a recycle inlet to the separator vessel that is above an inlet of the slurry oil stream. An embodiment of the invention is one, any or all of prior embodiments in this paragraph up through the seventh embodiment in this paragraph further comprising refluxing a portion of the cycle oil stream to a reflux inlet to the separator vessel that is above the recycle inlet. An embodiment of the invention is one, any or all of prior embodiments in this paragraph up through the seventh embodiment in this paragraph further comprising pulling a vacuum on a receiver overhead stream from the receiver and feeding it to a drain drum. An embodiment of the invention is one, any or all of prior embodiments in this paragraph up through the seventh embodiment in this paragraph further comprising refluxing a portion of the cycle oil stream to the separator vessel. An embodiment of the invention is one, any or all of prior embodiments in this paragraph up through the seventh embodiment in this paragraph further comprising recycling a portion of the heavy stream from a bottom of a separator vessel to a recycle inlet to the separator vessel that is above an inlet of the slurry oil stream and refluxing the portion of the cycle oil stream to a reflux inlet to the separator vessel that is above the recycle inlet. An embodiment of the invention is one, any or all of prior embodiments in this paragraph up through the seventh embodiment in this paragraph further comprising recovering the heavy stream with an API that is lower than the slurry oil stream and producing carbon black feedstock. An embodiment of the invention is one, any or all of prior embodiments in this paragraph up through the seventh embodiment in this paragraph further comprising recovering diesel from the cycle oil stream.

An eighth embodiment of the invention is a process for recovering catalytically cracking hydrocarbons comprising feeding a hydrocarbon feed stream to an FCC reactor and contacting the hydrocarbon feed stream with catalyst to catalytically crack the hydrocarbon feed stream to provide a cracked stream; disengaging the catalyst from the cracked stream; fractionating the cracked stream into products including a slurry oil stream from a bottom of a main fractionation column; separating the slurry oil stream into a separator overhead stream and a heavy stream under vacuum pressure in a separator vessel; condensing the separator overhead stream; separating the condensed overhead stream in a receiver; recovering a cycle oil stream from a bottom of the receiver; and obtaining an upgraded stream from the cycle oil stream. An embodiment of the invention is one, any or all of prior embodiments in this paragraph up through the eighth embodiment in this paragraph further comprising heating the slurry oil stream before the separation step. An embodiment of the invention is one, any or all of prior embodiments in this paragraph up through the eighth embodiment in this paragraph further comprising recycling a portion of the heavy stream to the separation step. An embodiment of the invention is one, any or all of prior embodiments in this paragraph up through the eighth embodiment in this paragraph further comprising recycling a portion of the heavy stream from a bottom of a separator vessel to a recycle inlet to the separator vessel that is above an inlet of the slurry oil stream. An embodiment of the invention is one, any or all of prior embodiments in this paragraph up through the eighth embodiment in this paragraph further comprising refluxing a portion of the cycle oil stream to a reflux inlet to the separator vessel that is above the recycle inlet. An embodiment of the invention is one, any or all of prior embodiments in this paragraph up through the eighth embodiment in this paragraph further comprising pulling a vacuum on a receiver overhead stream from the receiver and feeding it to a drain drum. An embodiment of the invention is one, any or all of prior embodiments in this paragraph up through the eighth embodiment in this paragraph further comprising refluxing a portion of the cycle oil stream to the separator vessel.

A ninth embodiment of the invention is a process for recovering catalytically cracked hydrocarbons comprising feeding a hydrocarbon feed stream to an FCC reactor and contacting the hydrocarbon feed stream with catalyst to catalytically crack the hydrocarbon feed stream to provide a cracked stream; disengaging the catalyst from the cracked stream; fractionating the cracked stream into products including a slurry oil stream from a bottom of a main fractionation column; separating the slurry oil stream into a separator overhead stream and a heavy stream under vacuum pressure in a separator vessel; condensing the separator overhead stream; separating the condensed overhead stream in a receiver; recovering a cycle oil stream from a bottom of the receiver; pulling a vacuum on a receiver overhead stream from the receiver; and obtaining an upgraded stream from the cycle oil stream. An embodiment of the invention is one, any or all of prior embodiments in this paragraph up through the ninth embodiment in this paragraph further comprising heating the slurry oil stream before the separation step. An embodiment of the invention is one, any or all of prior embodiments in this paragraph up through the ninth embodiment in this paragraph further comprising recovering the heavy stream with an API that is lower than the slurry oil stream and producing carbon black feedstock.

A tenth embodiment of the invention is a process for catalytically cracking hydrocarbons comprising feeding a hydrocarbon feed stream to an FCC reactor and contacting the hydrocarbon feed stream with catalyst to catalytically crack the hydrocarbon feed stream to provide a cracked stream; disengaging the catalyst from the cracked stream; fractionating the cracked stream into products including a slurry oil stream from a bottom of a main fractionation column; separating the slurry oil stream into a cycle oil process stream and a heavy stream under vacuum pressure in a separator; and refluxing the cycle oil process stream to the main fractionation column. An embodiment of the invention is one, any or all of prior embodiments in this paragraph up through the tenth embodiment in this paragraph further comprising hydrocracking a cycle oil stream from the main fractionation column. An embodiment of the invention is one, any or all of prior embodiments in this paragraph up through the tenth embodiment in this paragraph further comprising heating the slurry oil stream before the separation step. An embodiment of the invention is one, any or all of prior embodiments in this paragraph up through the tenth embodiment in this paragraph further comprising condensing a separator overhead stream from an overhead of the separator, separating the condensed overhead stream in a receiver and taking the cycle oil process stream from a bottom of the receiver. An embodiment of the invention is one, any or all of prior embodiments in this paragraph up through the tenth embodiment in this paragraph further comprising pulling a vacuum on a receiver overhead stream from the receiver and feeding it to a drain drum. An embodiment of the invention is one, any or all of prior embodiments in this paragraph up through the tenth embodiment in this paragraph further comprising withdrawing a cycle oil stream from the main fractionation column, hydrocracking a portion of the cycle oil stream and returning another portion of the cycle oil stream to main fractionation column. An embodiment of the invention is one, any or all of prior embodiments in this paragraph up through the tenth embodiment in this paragraph further comprising withdrawing the cycle oil stream from the main fractionation column from an outlet that is at a higher elevation than an inlet of the cycle oil process stream refluxed to the main fractionation column. An embodiment of the invention is one, any or all of prior embodiments in this paragraph up through the tenth embodiment in this paragraph further comprising cooling the another portion of the cycle oil stream before it is returned to the main fractionation column. An embodiment of the invention is one, any or all of prior embodiments in this paragraph up through the tenth embodiment in this paragraph further comprising recovering a diesel stream and/or an aromatics stream from the hydrocracked cycle oil stream.

An eleventh embodiment of the invention is a process for catalytically cracking hydrocarbons comprising feeding a hydrocarbon feed stream to an FCC reactor and contacting the hydrocarbon feed stream with catalyst to catalytically crack the hydrocarbon feed stream to provide a cracked stream; disengaging the catalyst from the cracked stream; fractionating the cracked stream into products including a slurry oil stream from a bottom of a main fractionation column; separating the slurry oil stream into a cycle oil process stream and a heavy stream under vacuum pressure in a separator; and refluxing the cycle oil process stream to the main fractionation column; and hydrocracking a cycle oil stream from the main fractionation column. An embodiment of the invention is one, any or all of prior embodiments in this paragraph up through the eleventh embodiment in this paragraph further comprising condensing a separator overhead stream from an overhead of the separator, separating the condensed overhead stream in a receiver and taking the cycle oil process stream from a bottom of the receiver. An embodiment of the invention is one, any or all of prior embodiments in this paragraph up through the eleventh embodiment in this paragraph further comprising pulling a vacuum on a receiver overhead stream from the receiver and feeding it to a drain drum. An embodiment of the invention is one, any or all of prior embodiments in this paragraph up through the eleventh embodiment in this paragraph further comprising withdrawing a cycle oil stream from the main fractionation column, hydrocracking a portion of the cycle oil stream and returning another portion of the cycle oil stream to main fractionation column. An embodiment of the invention is one, any or all of prior embodiments in this paragraph up through the eleventh embodiment in this paragraph further comprising withdrawing the cycle oil stream from the main fractionation column from an outlet that is at a higher elevation than an inlet of the cycle oil process stream refluxed to the main fractionation column. An embodiment of the invention is one, any or all of prior embodiments in this paragraph up through the eleventh embodiment in this paragraph further comprising recovering a diesel stream and/or an aromatics stream from the hydrocracked cycle oil stream.

A twelfth embodiment of the invention is a process for catalytically cracking hydrocarbons comprising feeding a hydrocarbon feed stream to an FCC reactor and contacting the hydrocarbon feed stream with catalyst to catalytically crack the hydrocarbon feed stream to provide a cracked stream; disengaging the catalyst from the cracked stream; fractionating the cracked stream into products including a slurry oil stream from a bottom of a main fractionation column; separating the slurry oil stream into a cycle oil process stream and a heavy stream under vacuum pressure in a separator; refluxing the cycle oil process stream to the main fractionation column; hydrocracking a cycle oil stream from the main fractionation column; and recovering a diesel stream and/or an aromatics stream from the hydrocracked cycle oil stream. An embodiment of the invention is one, any or all of prior embodiments in this paragraph up through the twelfth embodiment in this paragraph further comprising condensing a separator overhead stream from an overhead of the separator, separating the condensed overhead stream in a receiver and taking the cycle oil process stream from a bottom of the receiver. An embodiment of the invention is one, any or all of prior embodiments in this paragraph up through the twelfth embodiment in this paragraph further comprising withdrawing the cycle oil stream from the main fractionation column, hydrocracking a portion of the cycle oil stream and returning another portion of the cycle oil stream to main fractionation column.

A thirteenth embodiment of the invention is an apparatus for producing upgraded product comprising an FCC reactor; a main fractionation column in communication with the FCC reactor; a vacuum separator in communication with a main bottoms line of the main fractionation column; and a hydrocracking unit in communication with a side outlet of the main fractionation column. An embodiment of the invention is one, any or all of prior embodiments in this paragraph up through the thirteenth embodiment in this paragraph wherein the main fractionation column is in downstream communication with the vacuum separator. An embodiment of the invention is one, any or all of prior embodiments in this paragraph up through the thirteenth embodiment in this paragraph further comprising a reflux inlet to the main fractionation column in downstream communication with the vacuum separator, the reflux inlet being at a lower elevation than the side outlet of the main fractionation column. An embodiment of the invention is one, any or all of prior embodiments in this paragraph up through the thirteenth embodiment in this paragraph wherein the main fractionation column is in downstream communication with a separator overhead line of the vacuum separator. An embodiment of the invention is one, any or all of prior embodiments in this paragraph up through the thirteenth embodiment in this paragraph further comprising a receiver in communication with a separator overhead line of the vacuum separator; and the main fractionation column in downstream communication with a receiver bottoms line of the receiver. An embodiment of the invention is one, any or all of prior embodiments in this paragraph up through the thirteenth embodiment in this paragraph wherein the reflux inlet to the main fractionation column is for the receiver bottoms line. An embodiment of the invention is one, any or all of prior embodiments in this paragraph up through the thirteenth embodiment in this paragraph further comprising a cooler in communication with a separator overhead line. An embodiment of the invention is one, any or all of prior embodiments in this paragraph up through the thirteenth embodiment in this paragraph further comprising an eductor in communication with a receiver overhead line of the receiver. An embodiment of the invention is one, any or all of prior embodiments in this paragraph up through the thirteenth embodiment in this paragraph further comprising a hydrotreating reactor in communication with the side outlet of the main fractionation column and a hydrocracking reactor is in downstream communication with the hydrotreating reactor. An embodiment of the invention is one, any or all of prior embodiments in this paragraph up through the thirteenth embodiment in this paragraph further comprising a return line to the main fractionation column in communication with the side outlet. An embodiment of the invention is one, any or all of prior embodiments in this paragraph up through the thirteenth embodiment in this paragraph further comprising a cooler on the return line. An embodiment of the invention is one, any or all of prior embodiments in this paragraph up through the thirteenth embodiment in this paragraph further comprising a heater in downstream communication with the main fractionation column and the vacuum separator is in downstream communication with the heater.

A fourteenth embodiment of the invention is an apparatus for producing upgraded product comprising an FCC reactor; a main fractionation column in communication with the FCC reactor; a vacuum separator in communication with a main bottoms line of the main fractionation column; the main fractionation column in downstream communication with the vacuum separator; and a hydrocracking unit in communication with a side outlet of the main fractionation column. An embodiment of the invention is one, any or all of prior embodiments in this paragraph up through the fourteenth embodiment in this paragraph further comprising a reflux inlet to the main fractionation column in downstream communication with the vacuum separator, the reflux inlet being at a lower elevation than the side outlet of the main fractionation column. An embodiment of the invention is one, any or all of prior embodiments in this paragraph up through the fourteenth embodiment in this paragraph wherein the main fractionation column is in downstream communication with a separator overhead line of the vacuum separator. An embodiment of the invention is one, any or all of prior embodiments in this paragraph up through the fourteenth embodiment in this paragraph further comprising a receiver in communication with a separator overhead line of the vacuum separator; and the main fractionation column in downstream communication with a receiver bottoms line of the receiver.

A fifteenth embodiment of the invention is an apparatus for producing upgraded product comprising an FCC reactor; a main fractionation column in communication with the FCC reactor; a vacuum separator in communication with a main bottoms line of the main fractionation column; the main fractionation column in downstream communication with a separator overhead line of the vacuum separator; and a hydrocracking unit in communication with a side outlet of the main fractionation column. An embodiment of the invention is one, any or all of prior embodiments in this paragraph up through the fifteenth embodiment in this paragraph further comprising a reflux inlet to the main fractionation column in downstream communication with the vacuum separator, the reflux inlet being at a lower elevation than the side outlet of the main fractionation column. An embodiment of the invention is one, any or all of prior embodiments in this paragraph up through the fifteenth embodiment in this paragraph further comprising a receiver in communication with the separator overhead line of the vacuum separator; and the main fractionation column in downstream communication with a receiver bottoms line of the receiver. An embodiment of the invention is one, any or all of prior embodiments in this paragraph up through the fifteenth embodiment in this paragraph further comprising a hydrotreating reactor in communication with the side outlet of the main fractionation column and a hydrocracking reactor is in downstream communication with the hydrotreating reactor.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. An apparatus for producing upgraded product comprising:
   an FCC reactor;
   a main fractionation column in communication with said FCC reactor;
   a vacuum separator in communication with a main bottoms line of said main fractionation column; and
   a hydrocracking unit in communication with a side outlet of said main fractionation column;
   wherein said main fractionation column is in downstream communication with said vacuum separator.

2. The apparatus of claim 1 further comprising a reflux inlet to said main fractionation column in downstream communication with said vacuum separator, said reflux inlet being at a lower elevation than said side outlet of said main fractionation column.

3. The apparatus of claim 2 wherein said main fractionation column is in downstream communication with a separator overhead line of said vacuum separator.

4. The apparatus of claim 3 further comprising a receiver in communication with a separator overhead line of said vacuum separator; and said main fractionation column in downstream communication with a receiver bottoms line of said receiver.

5. The apparatus of claim 4 wherein said reflux inlet to said main fractionation column is for said receiver bottoms line.

6. The apparatus of claim 4 further comprising a cooler in communication with a separator overhead line.

7. The apparatus of claim 4 further comprising an eductor in communication with a receiver overhead line of said receiver.

8. The apparatus of claim 1 further comprising a hydrotreating reactor in communication with said side outlet of said main fractionation column and a hydrocracking reactor is in downstream communication with said hydrotreating reactor.

9. The apparatus of claim 1 further comprising a return line to said main fractionation column in communication with said side outlet.

10. The apparatus of claim 9 further comprising a cooler on said return line.

11. The apparatus of claim 1 further comprising a heater in downstream communication with said main fractionation column and said vacuum separator is in downstream communication with said heater.

12. An apparatus for producing upgraded product comprising:
 an FCC reactor;
 a main fractionation column in communication with said FCC reactor;
 a vacuum separator in communication with a main bottoms line of said main fractionation column;
 said main fractionation column in downstream communication with said vacuum separator; and
 a hydrocracking unit in downstream communication with a side outlet of said main fractionation column.

13. The apparatus of claim 12 further comprising a reflux inlet to said main fractionation column in downstream communication with said vacuum separator, said reflux inlet being at a lower elevation than said side outlet of said main fractionation column.

14. The apparatus of claim 12 wherein said main fractionation column is in downstream communication with a separator overhead line of said vacuum separator.

15. The apparatus of claim 12 further comprising a receiver in communication with a separator overhead line of said vacuum separator; and said main fractionation column in downstream communication with a receiver bottoms line of said receiver.

16. An apparatus for producing upgraded product comprising:
 an FCC reactor;
 a main fractionation column in communication with said FCC reactor;
 a vacuum separator in communication with a main bottoms line of said main fractionation column;
 said main fractionation column in downstream communication with a separator overhead line of said vacuum separator; and
 a hydrocracking unit in communication with a side outlet of said main fractionation column.

17. The apparatus of claim 16 further comprising a reflux inlet to said main fractionation column in downstream communication with said vacuum separator, said reflux inlet being at a lower elevation than said side outlet of said main fractionation column.

18. The apparatus of claim 16 further comprising a receiver in communication with said separator overhead line of said vacuum separator; and said main fractionation column in downstream communication with a receiver bottoms line of said receiver.

19. The apparatus of claim 16 further comprising a hydrotreating reactor in communication with said side outlet of said main fractionation column and a hydrocracking reactor is in downstream communication with said hydrotreating reactor.

* * * * *